(12) United States Patent
Han

(10) Patent No.: US 8,532,238 B2
(45) Date of Patent: Sep. 10, 2013

(54) SUBSAMPLING BASED RECEIVER USING FREQUENCY SELECTIVE NOISE CANCELLER

(75) Inventor: Seon-Ho Han, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 190 days.

(21) Appl. No.: 13/023,248

(22) Filed: Feb. 8, 2011

(65) Prior Publication Data

US 2011/0194657 A1 Aug. 11, 2011

(30) Foreign Application Priority Data

Feb. 8, 2010 (KR) .................. 10-2010-0011549
Oct. 8, 2010 (KR) .................. 10-2010-0098106

(51) Int. Cl.
*H03D 1/04* (2006.01)

(52) U.S. Cl.
USPC ........... 375/346; 375/347; 375/349; 375/350; 455/323; 455/77

(58) Field of Classification Search
USPC ............. 375/346, 347, 349, 350; 455/323, 455/77
See application file for complete search history.

(56) References Cited

U.S. PATENT DOCUMENTS

| | | | | |
|---|---|---|---|---|
| 5,729,230 A | * | 3/1998 | Jensen et al. | 341/143 |
| 6,243,430 B1 | * | 6/2001 | Mathe | 375/346 |
| 6,476,754 B2 | | 11/2002 | Löwenborg et al. | |
| 6,799,131 B1 | * | 9/2004 | Steiner et al. | 702/107 |
| 7,106,388 B2 | * | 9/2006 | Vorenkamp et al. | 348/726 |
| 7,558,556 B1 | * | 7/2009 | Moloudi et al. | 455/323 |
| 7,636,407 B2 | * | 12/2009 | Maeda et al. | 375/349 |
| 7,809,076 B1 | * | 10/2010 | Ghobrial et al. | 375/285 |
| 8,160,187 B1 | * | 4/2012 | Turner et al. | 375/346 |
| 8,184,048 B2 | * | 5/2012 | Yoo et al. | 342/357.73 |
| 8,213,525 B2 | * | 7/2012 | Caire et al. | 375/260 |
| 8,363,762 B2 | * | 1/2013 | Van de Wiel et al. | 375/346 |
| 2002/0047942 A1 | * | 4/2002 | Vorenkamp et al. | 348/731 |
| 2002/0159548 A1 | * | 10/2002 | Evans et al. | 375/346 |
| 2002/0169603 A1 | | 11/2002 | Sculley | |
| 2002/0181614 A1 | | 12/2002 | Mostafa et al. | |
| 2003/0050027 A1 | | 3/2003 | Muhammad et al. | |
| 2005/0218974 A1 | * | 10/2005 | Franca-Neto et al. | 327/552 |

(Continued)

FOREIGN PATENT DOCUMENTS

CN  1222269 A  7/1999
WO  WO 97/40587 A1  10/1997

OTHER PUBLICATIONS

Ronald F. Cormier Jr. et al., "Combining Subband Decomposition and Sigma Delta Modulation for Wideband A/D Conversion", ISCAS, 1994, pp. 357-360, vol. 5.

(Continued)

*Primary Examiner* — Daniel Washburn
*Assistant Examiner* — Berhanu Tadese

(57) ABSTRACT

Provided is a frequency selective noise canceller including: a frequency selective single to differential converter having a band pass filter function, converting a received single input signal into a differential signal in a wanted signal pass frequency band and into a common mode signal in an unwanted signal frequency band; and a common mode rejector functioning as a load having an arbitrary impedance with respect to the differential signal outputted from the frequency selective single to differential converter and functioning as a filter with respect to the common mode signal.

17 Claims, 12 Drawing Sheets

(56) References Cited

U.S. PATENT DOCUMENTS

| | | | |
|---|---|---|---|
| 2009/0010310 A1* | 1/2009 | Rofougaran et al. | 375/135 |
| 2009/0034592 A1* | 2/2009 | Mirfakhraei et al. | 375/222 |
| 2009/0085645 A1* | 4/2009 | Tanaka | 327/407 |
| 2009/0137213 A1* | 5/2009 | Rofougaran et al. | 455/77 |
| 2009/0219204 A1* | 9/2009 | Yoo et al. | 342/357.12 |
| 2010/0322363 A1* | 12/2010 | Ghobrial et al. | 375/347 |
| 2011/0110473 A1* | 5/2011 | Keehr et al. | 375/350 |

OTHER PUBLICATIONS

Ronald F. Cormier, Jr. et al., "A Fourth Order Bandpass Delta-Sigma Modulator with Digitally Programmable Passband Frequency", Analog Integrated Circuits and Signal Processing, 1997, pp. 217-229, vol. 12, Kluwer Academic Publishers, Boston.

Aria Eshraghi et al., "A Comparative Analysis of Parallel Delta-Sigma ADC Architectures", IEEE Transactions on Circuits and Systems-I: Regular Papers, Mar. 2004, pp. 450-458, vol. 51, No. 3, IEEE.

Munkyo Seo et al., "Comprehensive Digital Correction of Mismatch Errors for a 400-Msamples/s 80-dB SFDR Time-Interleaved Analog-to-Digital Converter", IEEE Transactions on Microwave Theory and Techniques, Mar. 2005, pp. 1072-1082, vol. 53, No. 3, IEEE.

Dr. Fang Xu, "Perfect data reconstruction algorithm of time interleaved ADCs", International Test Conference, 2006, Paper 13.3, IEEE.

* cited by examiner

Fig. 3
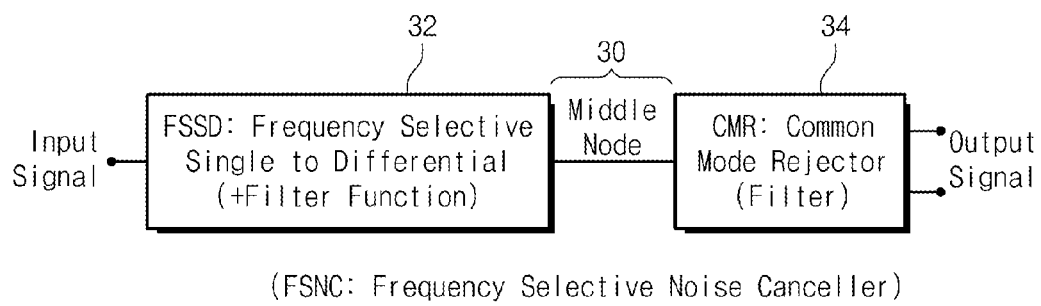
(FSNC: Frequency Selective Noise Canceller)
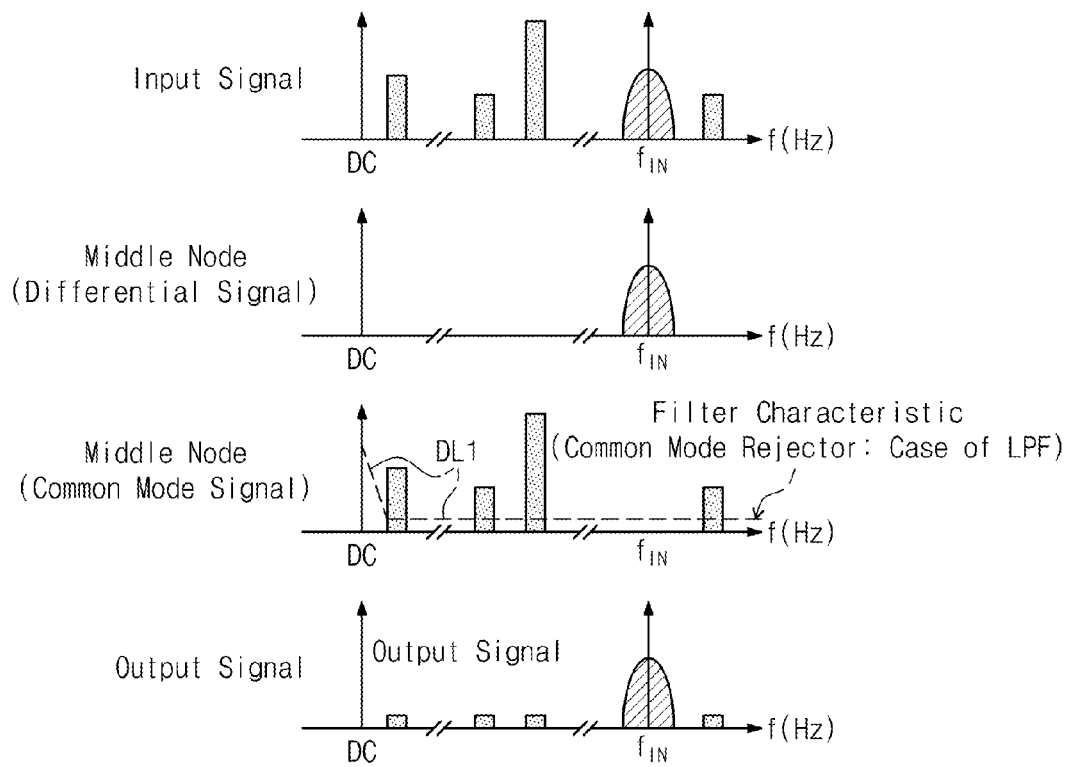

Fig. 9
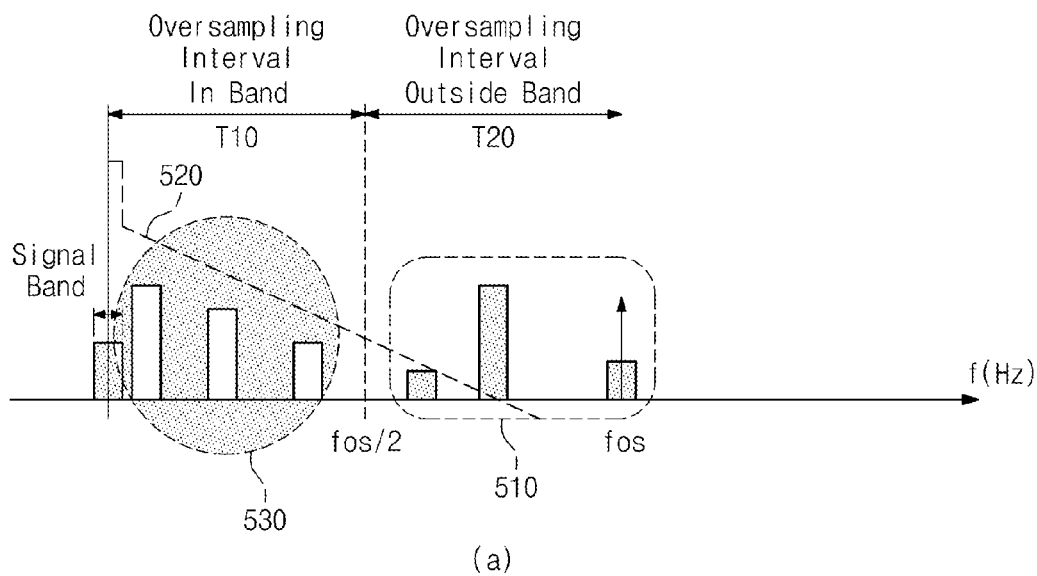
(a)
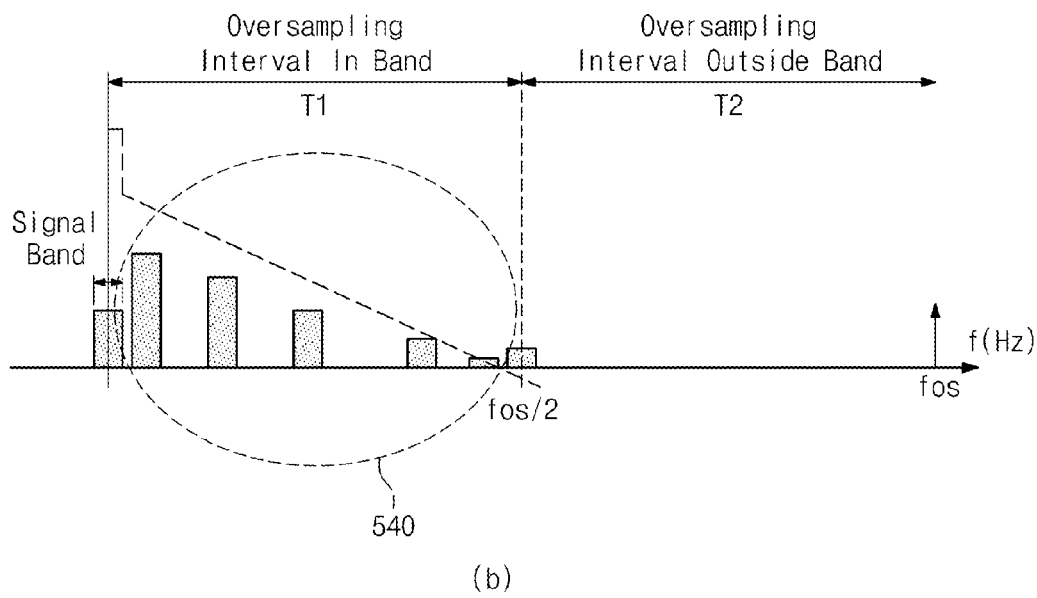
(b)

SUBSAMPLING BASED RECEIVER USING FREQUENCY SELECTIVE NOISE CANCELLER

CROSS-REFERENCE TO RELATED APPLICATIONS

This U.S. non-provisional patent application claims priority under 35 U.S.C. §119 of Korean Patent Application Nos. 10-2010-0011549, filed on Feb. 8, 2010, and 10-2010-0098106, filed on Oct. 8, 2010, the entire contents of which are hereby incorporated by reference.

BACKGROUND OF THE INVENTION

The present invention disclosed herein relates to a wireless communication receiver, and more particularly, to a subsampling based receiver using a frequency selective noise canceller.

In case of a digital receiver, it has advantages for resolving different limitations such as power consumption, an occupying area of a chip, and market applicability but disadvantages for realizing an actual receiver. For example, in terms of a subsampling method, a noise removing scheme, integration of a receiver, or realization of an analog-to-digital converter in the digital receiver, the digital receiver is still insufficient and thus needs to be improved further.

SUMMARY OF THE INVENTION

The present invention provides a frequency selective noise canceller improving performance of a digital-type receiver.

The present invention also provides a digital-type receiver with maximized or improved noise removing performance.

The present invention also provides a digital-type receiver with a subsampling method of high noise removing performance.

The present invention also provides a digital-type receiver removing digitally noise signals adjacent to a wanted signal.

The present invention also provides a digital-type receiver fabricated compact mainly with a design of a digital region, not with a design of an analog region.

The present invention also provides a digital-type wireless communication receiver guaranteeing a sufficient design margin of an analog-to-digital converter.

Embodiments of the present invention provide frequency selective noise cancellers for effectively reducing overlapping noise during subsampling, including: a frequency selective single to differential converter having a band pass filter function, converting a received single input signal into a differential signal in a wanted signal pass frequency band and into a common mode signal in an unwanted signal frequency band; and a common mode rejector functioning as a load having an arbitrary impedance with respect to the differential signal outputted from the frequency selective single to differential converter and functioning as a filter with respect to the common mode signal.

In some embodiments, the frequency selective noise cancellers may further include a function of an impedance converter converting a signal voltage amplitude of signal power delivered to a rear end of the common mode rejector.

In other embodiments, the common mode rejector may be realized using a passive device or a differential amplifier with common mode rejection.

In other embodiments of the present invention, receivers include: a frequency selective noise canceller having a band pass filtering function, converting a received single input signal into a differential signal in a wanted signal pass frequency band to output it through a differential output terminal, and outputting the received signal input signal as a common mode signal in an unwanted signal frequency band to filter the common mode signal of the differential output terminal, thereby effectively reducing overlapping noise during subsampling; an analog-to-digital converter sampling an input signal with a sampling clock of a predetermined frequency, subsampling a carrier frequency of the input signal and oversampling a bandwidth of a wanted signal, thereby converting an analog signal applied through the frequency selective noise canceller into a digital signal of a DC frequency band or a digital signal of an intermediate frequency band; and a digital signal processor processing the digital signal outputted from the analog-to-digital converter according to a predetermined reception processing function.

In still other embodiments of the present invention, receivers include: a single input/output filter and variable gain amplifier converting a single input signal having a relatively broad input signal amplitude range into a signal input amplitude range at a rear end by performing band pass filtering and variable gain amplification; a frequency selective noise canceller having a band pass filtering function, converting the single input signal into a differential signal in a wanted signal pass frequency band to output it through a differential output terminal, outputting the single input signal as a common mode signal in an unwanted signal frequency band to filter the common mode signal of the differential output terminal, thereby effectively reducing overlapping noise during subsampling; an analog-to-digital converter including a high-speed input unit and having a signal input amplitude range processing all a wanted signal and some unwanted signals adjacent thereto, the high-speed input unit sampling an input signal with a sampling clock of a predetermined frequency, subsampling a carrier frequency of the input signal and oversampling a bandwidth of a wanted signal thereby converting an analog signal applied through the frequency selective noise canceller into a digital signal of a DC frequency band or a digital signal of an intermediate frequency band, and sampling a signal of a higher frequency than that of the sampling clock, and; and a digital signal processor performing a signal frequency conversion, channel filtering, and variable gain amplification function and a modulation/demodulation function by processing the digital signal outputted from the analog-to-digital converter.

In even other embodiments of the present invention, receivers include: a frequency selective noise canceller having a band pass filtering function, converting a single input signal into a differential signal in a wanted signal pass frequency band to output it through a differential output terminal, and outputting the signal input signal as a common mode signal in an unwanted signal frequency band to perform filtering on the common mode signal of the differential output terminal, thereby effectively reducing overlapping noise during subsampling; a differential variable gain amplifier performing band pass filtering and variable gain amplification on a signal outputted from the frequency selective noise canceller to convert it into a signal input amplitude range of the next end; an analog-to-digital converter including a high-speed input unit and having a signal input amplitude range processing all a wanted signal and some unwanted signals adjacent thereto, the high-speed input unit sampling an input signal with a sampling clock of a predetermined frequency, subsampling a carrier frequency of the input signal and oversampling a bandwidth of a wanted signal thereby converting an analog signal applied through the differential variable gain amplifier into a digital signal of a DC frequency band or a digital signal of an intermediate frequency band, and sampling a signal of a higher frequency than that of the sampling clock; and a digital signal processor performing a signal frequency conversion, channel filtering, and variable gain amplification function and a modulation/demodulation function by processing the digital signal outputted from the analog-to-digital converter.

In yet other embodiments of the present invention, receiver including: a frequency selective noise canceller having a band pass filtering function, converting a received single input signal into a differential signal in a wanted signal pass frequency band to output it through a differential output terminal, and outputting the received signal input signal as a common mode signal in an unwanted signal frequency band; an analog-to-digital converter having a signal input amplitude range processing all a wanted signal and some unwanted signals adjacent thereto and including a common mode rejector differential amplifier and a high speed input unit, the common mode rejector differential amplifier performing filtering on the common mode signal of the differential output terminal to reduce overlapping noise during subsampling and variable-gain-amplifying an output of the differential output terminal, with a part of a band filter function, to convert it into a signal input amplitude range of the next end, the high-speed input unit sampling an input signal with a sampling clock of a predetermined frequency, subsampling a carrier frequency of the input signal and oversampling a bandwidth of a wanted signal thereby converting an analog signal applied through the common mode rejector differential amplifier into a digital signal of a DC frequency band or a digital signal of an intermediate frequency band, and sampling a signal of a higher frequency than that of the sampling clock, and; and a digital signal processor performing a signal frequency conversion, channel filtering, and variable gain amplification function and a modulation/demodulation function by processing the digital signal outputted from the analog-to-digital converter.

In some embodiments, the variable gain amplifier may further include an interferer signal reduction or band pass filtering function.

In other embodiments, the analog-to-digital converter may include a high-speed input unit for sampling a signal having a higher frequency than that of the sampling clock.

In still other embodiments, the frequency selective noise canceller may further include a function of an impedance converter for converting a signal voltage amplitude of signal power delivered to the analog-to-digital converter.

In even other embodiments, the common mode signal may be removed by a circuit of a differential amplifier form equipped in the analog-to-digital converter.

In yet other embodiments, the analog-to-digital converter may consist of one or a plurality of parallel analog-to-digital converters, wherein in case of the plurality of parallel analog-to-digital converters, each analog-to-digital converter classifies a signal channel of a wideband into a plurality of sub signal channels and processes a signal, so that the digital signal processor performs digital filtering and digital data recombination in a digital part and the analog-to-digital converter receives at least one sampling clock signal.

In further embodiments, the analog-to-digital converter may include an I-path subsampling analog-to-digital converter and a Q-path subsampling analog-to-digital converter, each of them converting an input analog signal into an I signal and a Q signal of an orthogonal relation in response to a first clock signal and a second clock signal of an orthogonal relation, so that the I signal and the Q signal are synchronized by a clock signal having the same phase in a digital block.

In still further embodiments, if the analog-to-digital converter includes an I-path subsampling analog-to-digital converter and a Q-path subsampling analog-to-digital converter, each of them may include one or a plurality of parallel analog-to-digital converter; and in case of the plurality of parallel analog-to-digital converters, each analog-to-digital converter classifies a signal channel of a wideband into a plurality of sub signal channels and processes a signal, so that the digital signal processor performs digital filtering and digital data recombination in a digital part and the analog-to-digital converter receives at least one sampling clock signal.

In even further embodiments, the analog-to-digital converter may have a broad signal input amplitude range processing all a wanted signal and some unwanted signals adjacent thereto.

In yet further embodiments, the digital signal processor may perform a signal frequency conversion, channel filtering, and variable gain amplification function and a modulation/demodulation function.

In yet further embodiments, an input signal amplitude range of the analog-to-digital converter may be adjusted according to variation of a full scale voltage of the analog-to-digital converter.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings:

FIG. 3 is a view illustrating a block configuration and a signal processing operation of FSNC according to an embodiment of the present invention;

FIG. 9 is a view illustrating a subsampling method used exemplarily in the present invention;

DETAILED DESCRIPTION OF PREFERRED EMBODIMENTS

Figure 1:
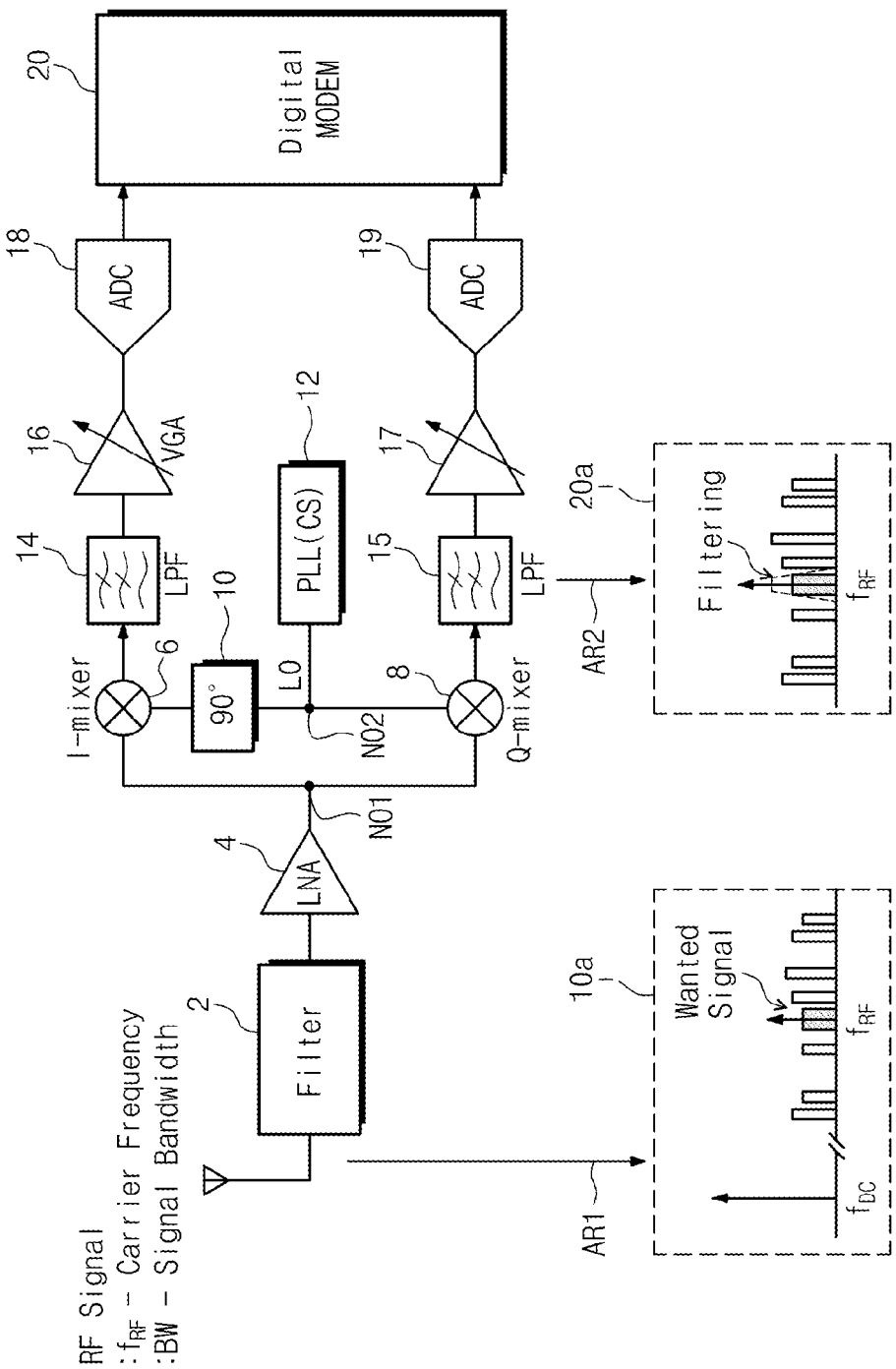
FIG. 1 is a view illustrating device blocks of a typical wireless communication receiver.

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

It will also be understood that when devices or lines are referred to as being connected to a target device block, it can be directly connected to the target device block, or intervening other devices or lines may also be present.

Additionally, like reference numerals refer to like elements throughout. In some drawings, connection relationship between devices and lines is merely shown for effective description of the technical contents and other devices or function blocks may be further included.

Should note that each embodiment described herein may include its complementary embodiment, and typical operations and functions of a wireless communication receiver are omitted not to obscure the ideas of the present invention.

Figure 2:
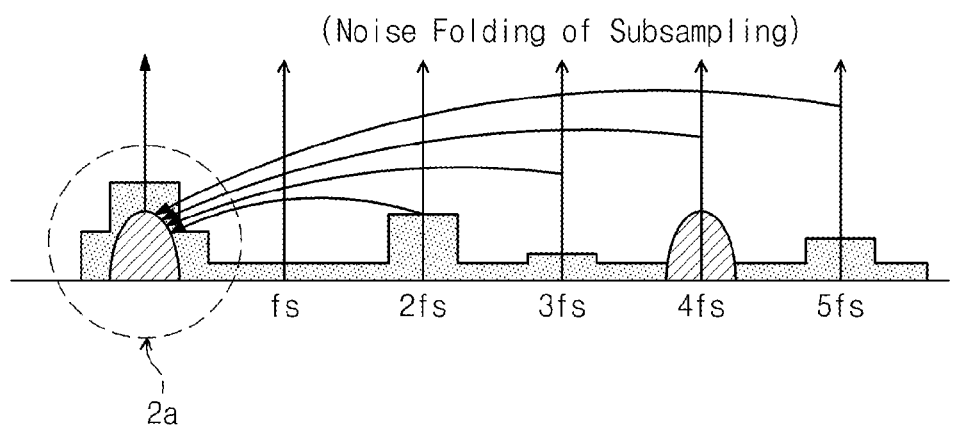
FIG. 2 is a view illustrating limitations during subsampling of FIG. 1.

First, only with an intention for providing more complete understanding of the present invention, referring to FIGS. 1 and 2, limitations that a typical analog-type receiver has and of a subsampling method will be sequentially illustrated.

FIG. 1 is a view illustrating device blocks of a typical wireless communication receiver. The receiver of FIG. 1 is one example of a receiver using a direct conversion method among signal converting methods.

Referring to FIG. 1, a high frequency RF signal received through an antenna is applied to a filter 2 and is band-filtered, and then is inputted to a low-noise amplifier (LNA) 4. When a signal amplified by the LNA 4 is applied to an I-mixer 6 and a Q-mixer through a node NO1 the I-mixer 6 converts the signal into an I channel signal of a lower frequency band according to a reference oscillation signal LO, which is phase-shifted by a phase shifter 10 and then is applied, and provides the converted I channel signal to a corresponding low pass filter 14. Moreover, the Q-mixer 8 converts the signal into a Q channel signal of a low frequency band according to the reference oscillation signal LO and provides the Q channel signal to a corresponding low pass filter 15. The low pass filters 14 and 15 filter the respectively received channel signals I and Q and provide them to respectively corresponding variable gain amplifiers 16 and 17. The variable gain amplifiers 16 and 17 amplify the channel signals so as to allow an analog-to-digital converter (ADC) at the back end to receive a signal of a predetermined amplitude (size). The ADCs 18 and 19 convert the individual received channel signals into digital signals, respectively, and then provide them to a digital modem 20. The digital modem 20 may perform a communication function by receiving and processing the digital signals.

In the receiver of FIG. 1, it is difficult to realize a filter that extracts only a wanted signal in a high RF frequency band so that a signal falling into a signal of a low frequency by a mixer is filtered. That is, a scheme obtaining a wanted signal in a low frequency band using an analog filter such as a low pass filter is adopted in the analog-type receiver of FIG. 1. For each of understanding, the reference number 10a shown with the arrow symbol AR1 of FIG. 1 represents an analog high frequency signal and the reference number 20a shown with the arrow symbol AR2 represents an analog low frequency signal of low pass filtering. A frequency conversion from a high frequency band to a low frequency band with respect to a signal reduces an operating frequency of an ADC converting an analog signal to a digital signal, such that ADC use of a low speed is possible. The variable gain amplifier adopted at the front end of the ADC serves to fit a size of signal applied to the ADC for an arbitrary reference size, so that a dynamic range of the ADC is designed relatively small.

Since an analog filter at the rear end of the mixer is obtained based on an analog design technique, it is relatively difficult to change a bandwidth or a form of a filter. Accordingly, a signal for each channel may be filtered using one analog filter. For this, a typical receiver maintains a center frequency of a signal, which is converted into a low frequency band using a frequency synthesizer, to be uniform. The frequency synthesizer generates the reference oscillation signal LO supplied to an analog mixer. Here, the reference oscillation signal is generally generated in a local oscillator (LO) in a phase locked loop (PLL).

In case of the analog-type receiver, since a task for removing unwanted interference signal, i.e., noise, is required until a received analog signal is converted into a digital signal, it is apparent that a frequency synthesizer, a mixer and a filter, and a variable gain amplifier are necessary. Since configuration devices of the receiver are obtained based on a design of an analog-type, it takes a long time to design it and redesign is required each time processes are upgraded.

If a wireless transmitter-receiver processing a signal of a multi-band and applicable in various application fields is developed, an analog design type has limitations in terms of power consumption, an occupying area of a chip, and fast market applicability.

Compared to this, the digital design type may cover a significant part of the limitations that the analog design type has, but it is difficult to actually realize it. Especially, in a case of a digital receiver that directly samples a signal of a high frequency band to process a digital signal, it is difficult to realize an ADC. That is, an ADC operating in a considerably high frequency and having a high bit resolution simultaneously needs to be mounted but it is very difficult to realize it through a current technique.

That is, since a sampling frequency of an ADC needs to be at least two times of a carrier signal to obtain a signal satisfying the Nyquist theorem, an ADC of 4 GHz sampling is required to process a signal of a 2 GHz band. Moreover, in order for obtaining an operating speed and a broad input signal amplitude, a dynamic range of an ADC needs to be large. Furthermore, even if the ADC is realized, since data output speed of the ADC is significantly high, a digital processor at the rear end receives a great amount of loads and power consumption due to a high-speed processing operation is drastically increased.

Accordingly, in case of a typical digital-type receiver, an analog circuit device such as a mixer for lowering a frequency band of a signal, a filter for removing noise, and a variable gain amplifier (VGA) for adjusting a gain of a signal to obtain a predetermined size of a signal is equipped at the front end of the ADC. Due to analog signal processing using the above analog circuit device, design and realization of an ADC is more easily accomplished.

A method of designing a receiver to evade limitations of actually realizing a digital-type receiver is a discrete-time signal processing design method that may be classified into intermediate operations of an analog design method and a complete digital design method. In case of a discrete-time signal processing based receiver, an amplified signal from filtering is processed by a discrete signal processor, so that its design is simple. Additionally, operating characteristics of internal configuration blocks performing discrete time signal processing tend to significantly depend on a clock frequency compared to an analog design method.

Since these frequency dependable operating characteristics are conceptually easy to design a receiver compared to an analog design method, it is advantageous in terms of time to market. However, although signals are processed in a discrete time domain, the nature of the signal is still an analog signal. Accordingly, it is difficult to sufficiently obtain an advantage to be achieved when a complete digital receiver is realized.

FIG. 2 is a view illustrating limitations during subsampling of FIG. 1.

Referring to FIG. 2, compared to a typical Nyquist sampling method, according to a subsampling method, all signals positioned at a place corresponding to N times of a sampling frequency $f_s$ finally overlap sampled signals due to aliasing as shown in the reference number 2a. Therefore, this simple subsampling method is impossible to obtain a wanted signal to noise ratio (SNR) from a final signal. Therefore, even in a typical Nyquist sampling method and subsampling method, an anti-aliasing filter is necessarily installed at the front end of an ADC.

As mentioned above, in terms of a subsampling method, a noise removing plan, integration of a receiver, or realization of an ADC in the digital receiver, the digital receiver is still insufficient and thus needs to be more improved.

Hereinafter, preferable embodiments for achieving purposes of the present invention will be described only with an intention for helping comprehensive understanding of the present invention.

First, FIG. 3 is a view illustrating a block configuration and a signal processing operation of FSNC according to an embodiment of the present invention.

Referring to FIG. 3, a frequency selective noise canceller (FSNC) includes a frequency selective single to differential (FSSD) 32 and a common mode rejector 34, in order to effectively reduce overlapping noise during subsampling.

The FSSD 32 has a function of a band pass filter, and a received single input signal is converted into a differential signal in a signal pass frequency band and is converted into a common mode signal in an unwanted signal frequency band.

Conceptually, the common mode rejecter (CMR) 34 serves as a load having arbitrary impedance with respect to the differential signal outputted from the FSSD 32, and serves as a filter with respect to the common mode signal. A filter constituting the CMR 34 may adopt a low pass filter, a band pass filter, or a high pass filter according to a configuration case.

Referring to a signal frequency waveform shown at the bottom of FIG. 3, when an input signal like the first waveform is applied to the FSSD 32, the second and third waveforms are outputted from a middle node, i.e., an output terminal of the FSSD 32. Here, the second waveform is a differential signal obtained from a wanted signal frequency band and the third waveform is a common mode signal obtained from an unwanted signal frequency band. The CMR 34 has the same filtering characteristic as a dash line DL1 in the third waveform and has band-pass characteristic with respect to the differential signal. Accordingly, in relation to an output signal at the output terminal of the CMR 34, like the fourth waveform, a wanted signal is substantially obtained and unwanted noise is drastically reduced.

Thus, unwanted noise is basically reduced due to the filtering characteristic of the FSSD 32, and unwanted noise is more effectively reduced due to a joint operation of a frequency selective differential signal output function of the FSSD 32 and the CMR 34.

The FSNC 30 may be more appropriately used for a subsampling based receiver.

Figure 4:
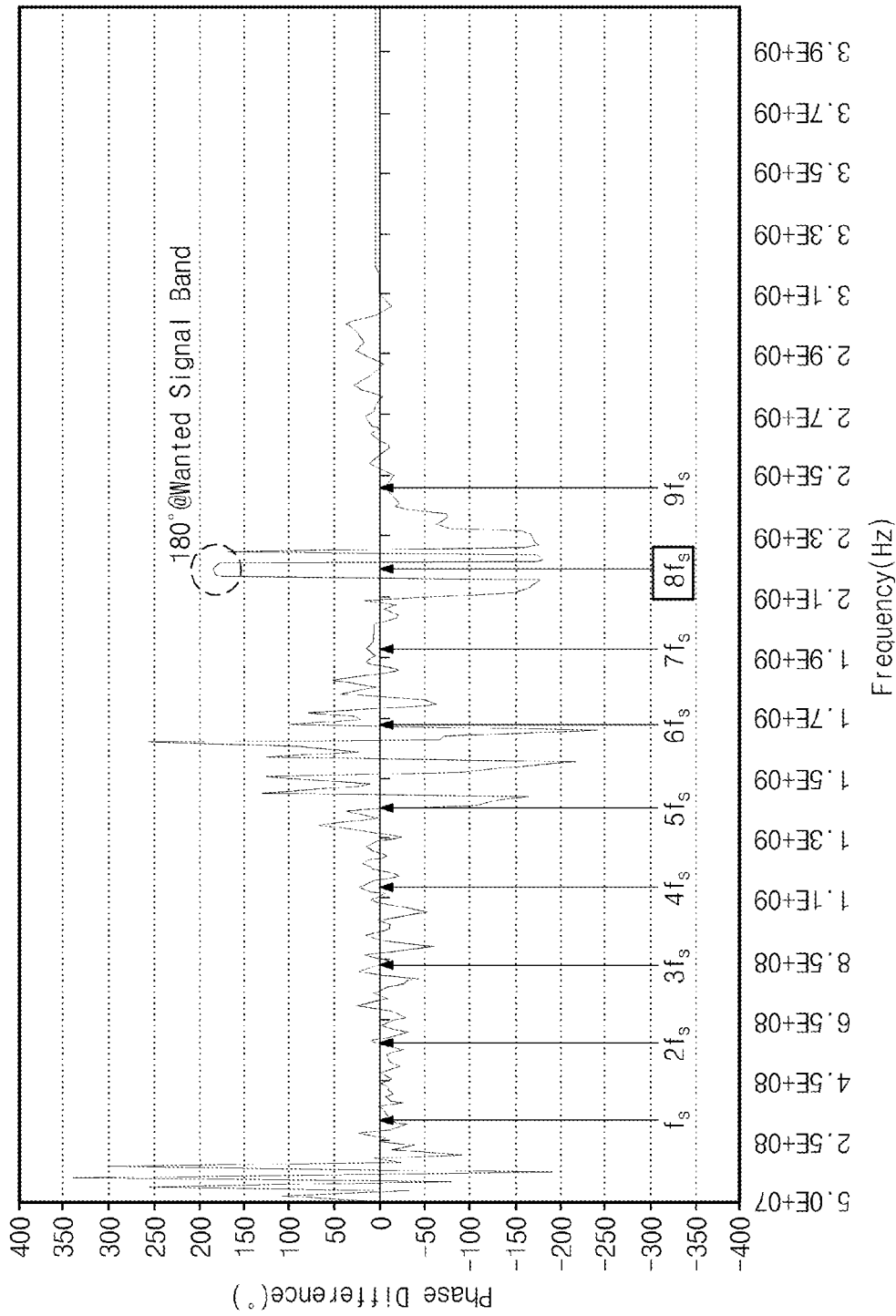
FIG. 4 is a view illustrating output phase characteristics of the FSSD in FIG. 3.

FIG. 4 is a view illustrating output phase characteristics of the FSNC in FIG. 3. The graph of FIG. 4 is a frequency waveform measuring a differential output phase difference of the manufactured FSSD 32, where an x-axis represents frequency and a y-axis represents a phase. The FSSD 32 may be fabricated in an integrated circuit using an active device such as a transistor or a passive device such as an inductor, a capacitor, or a resistor, but it is hard to expect the wanted performance in very narrow signal band and a high carrier frequency region. Because, Q of an integrated circuit device is low by parasite components caused by an active device or a passive device. Accordingly, if the FSSD 32 is fabricated using a device having a band pass filter function without using an integrated circuit, although there are some not ideal frequency regions, performance measurement result is satisfactory as shown in FIG. 4. In FIG. 4, when a band of a wanted frequency selective single to differential is about 2 GHz, there is a phase difference of about 180° and only a common mode signal output is provided since there is almost no output differential phase difference in other frequency bands.

Since a function of the FSNC 30 effectively removes noise when a subsampling based receiver is integrated, it contributes to improving a receiver. In case of a typical subsampling based receiver, when clock noise or various noise occurring in an ADC is leaked to a low noise amplifier and is amplified through a parasite component, reception performance may be deteriorated.

Therefore, as an input of an ADC of a subsampling based operation, if it provides an output of the FSNC 30, overlapping folding noise in a wanted signal band is greatly reduced. For example, as shown in FIG. 4, if a wanted signal band is about 2 GHz and a subsampling frequency fs of an ADC is about 270 MHz, since there is almost no differential output phase difference in a frequency region other than a wanted signal band, a common mode signal is obtained. This common mode signal is removed by a filtering function of the CMR 34.

Here, a filtering function of the CMR 34 may be realized using the differential amplifier or using an OP amp circuit of a differential amplifier form in an ADC.

A noise removing method applied for the receiver according to the embodiments of the present invention uses the same FSNC 30 of FIG. 3. According to which position of a receiver the FSNC 30 is adopted, characteristics of the receiver may have various differences.

The FSNC 30 may further include an impedance converter converting a signal voltage size of a signal power delivered to the rear end of the CMR 34.

Figure 5:
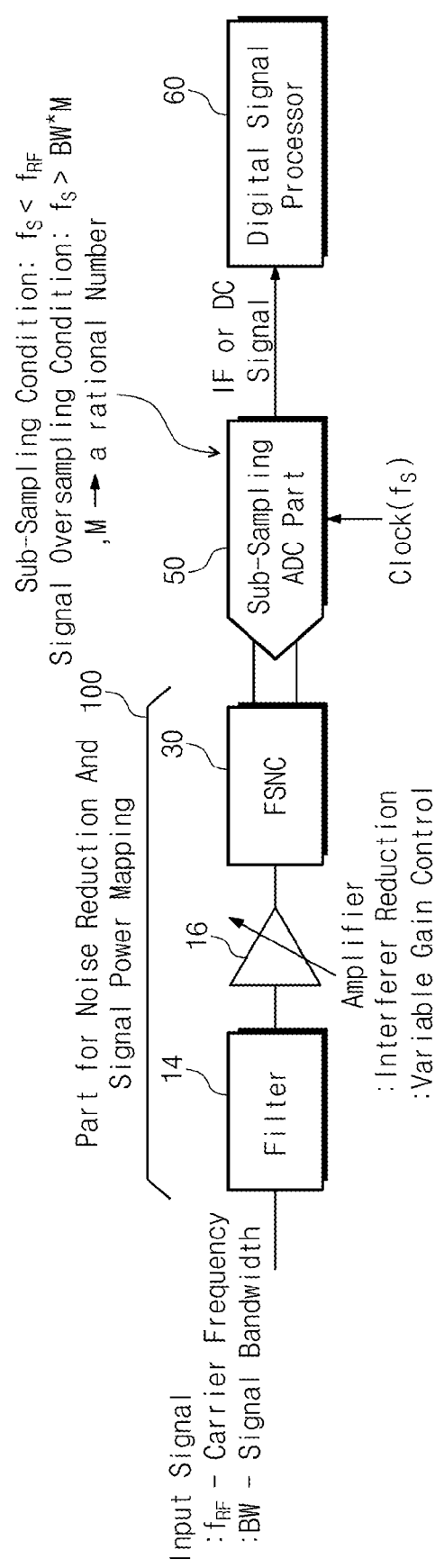
FIG. 5 is a block diagram of a subsampling based receiver including the FSNC of FIG. 3 adopted at a middle end.

FIG. 5 is a block diagram of a subsampling based receiver including the FSNC of FIG. 3 adopted at a middle end.

Referring to FIG. 5, the receiver includes a filter 14, a variable amplifier 16, an FSNC 30, an ADC 50, and a digital signal processor (DSP) 60.

The FSNC 30 is installed at the middle end of the receiver, i.e., between the variable amplifier 16 and the ADC 50, to perform a noise removing function. That is, the FSNC 30 has a band pass filtering function and converts a received single input signal into a differential signal in a wanted signal pass frequency band to output it through a differential output terminal and output it as a common mode signal in an unwanted signal frequency band, so that filtering is performed on the common mode signal of the differential output terminal. As a result, overlapping noise during subsampling is effectively reduced.

The DSP 60 processes the digital signal outputted from the ADC 50 according to a set reception processing function. Here, the DSP 60 performs functions such as a signal frequency conversion, channel filtering, and variable gain amplification and also performs a modulation/demodulation function.

The filter 14 is a single input/output filter. The filter 14 and the variable gain amplifier 16 are installed at the front end of the FSNC 30 to perform band pass filtering and variable amplification. Accordingly, an input signal having a relatively broad signal amplitude range is converted into a single input signal having a dynamic range at the rear end.

The ADC 50 samples an input signal with a sampling clock of a predetermined frequency, so that subsampling is accomplished on a carrier frequency of an input signal and oversampling is accomplished on a band of a wanted signal. Therefore, an analog signal applied through the FSNC 30 is converted into a digital signal of a DC frequency band or a digital signal of an intermediate frequency band.

The ADC 50 may be realized with a single ADC, an I/Q ADC, a multiple ADC, or an I/Q multiple ADC, if necessary. For example, in case that the ADC 50 is realized with the single ADC, the internal configuration of the DSP 60 may depend on a realization method of the ADC 50.

Additionally, if the receiver adopts the I/Q ADC, since clocks (the first clock and the second clock perpendicular thereto) having respective phase differences of 90° become sampling clocks, I/Q digital outputs have respective phase differences of 90°. The I/Q digital output is digitally and accurately latched simply with the same phase clock in the DSP. Compared to this, in case of a typical receiver, signals separated into the I/Q channel are applied from a mixer into an ADC and the ADC samples the signals with the same phase clock.

Additionally, in a typical receiver, during sampling of the I/Q ADC, with an additional I/Q sampler installed at the front end of the ADC, if it is assumed that a clock phase is set to an I channel, data of the Q channel have a phase difference with respect to the I channel. Therefore, data eye at the point of the sampling of the I/Q ADC at the rear end of the I/Q sampler tend to be reduced. However, in case of the receiver of FIG. 5, because the I and Q channel signals are separately sampled with clocks having respective phase differences of 90°, data eye reduction may be resolved. Furthermore, since an additional sampler is removed in the receiver of FIG. 5, an occupying area of a chip and power consumption are decreased. In addition, compared to a typical receiver adopting a passive subsampler, signal power reduction may be prevented.

In FIG. 5, the filter 14, the variable gain amplifier 16, and the FSNC 30 reduce noise and adjust power of an input signal, so that they may correspond to a signal noise reduction and signal power mapping unit.

Figure 6:
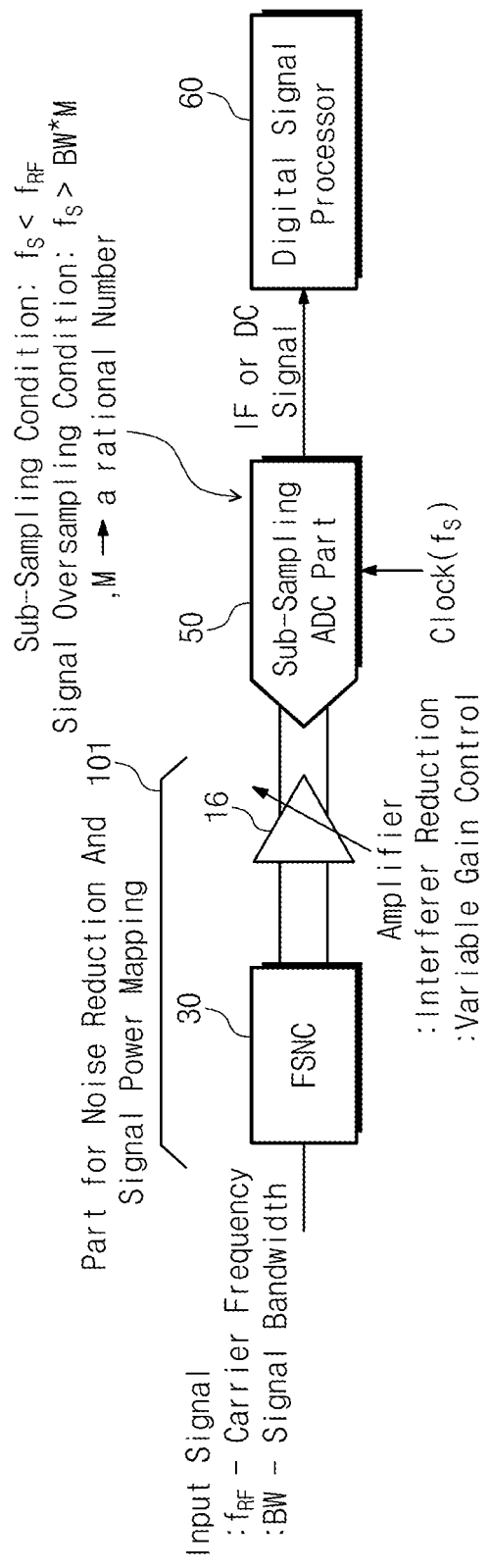
FIG. 6 is a device block diagram of a subsampling based receiver adopting the FSNC of FIG. 3 at this initial state according to another embodiment of the present invention.

FIG. 6 is a device block diagram of a subsampling based receiver adopting the FSNC of FIG. 3 at this initial state according to another embodiment of the present invention.

Referring to FIG. 6, except that the FSNC 30 is disposed at the initial state of the receiver and the variable gain amplifier 16 variable-amplifies a differential signal, the receiver is the same as that of FIG. 5.

The FSNC 30 has a band pass filtering function, converts a received single input signal into a differential signal in a signal pass frequency band to output it through a differential output terminal, performs filtering on a common mode signal of the differential output terminal. Thus, overlapping noise during subsampling is reduced.

The differential variable gain amplifier 16 performs band pass filtering and variable gain amplification on a signal outputted from the FSNC 30 to convert it into a differential input signal having a processing frequency band and an amplification amplitude of the next end.

Similarly, the ADC 50 may be realized with a single ADC, an I/Q ADC, a multiple ADC, or an I/Q multiple ADC, if necessary. For example, in case that the ADC 50 is realized with the single ADC, the DSP 60 generates an I/Q signal to obtain a complex signal. Like this, the internal configuration of the DSP 60 may depend on a realization method of the ADC 50.

Compared to the receiver of FIG. 5, the receiver of FIG. 6 has the less number of filters due to the initial-state arrangement of the FSNC. By minimizing or reducing the number of filters, the subsampling based receiver may be more completely integrated.

Figure 7:
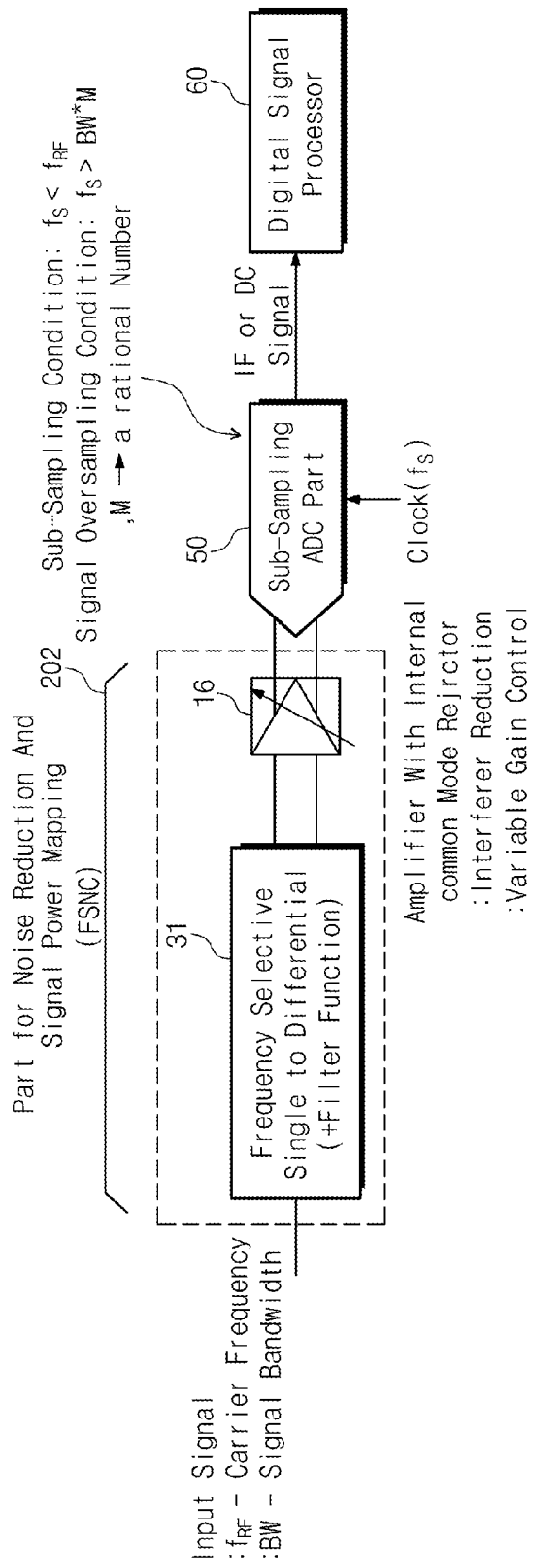
FIG. 7 is a device block diagram of a subsampling based receiver adopting the FSNC of FIG. 3 and a variable amplifier jointly according to another embodiment of the present invention.

FIG. 7 is a device block diagram of a subsampling based receiver adopting the FSNC of FIG. 3 and a variable gain amplifier jointly according to another embodiment of the present invention.

Referring to FIG. 7, except that the FSSD constituting the FSNC 30 is disposed at the initial stage of the receiver, the variable gain amplifier 16 variable-amplifies a differential signal, and the CMR is integrated into the variable gain amplifier 16, the receiver has the same configuration as that of FIG. 5. When comparing the configurations of FIGS. 6 and 7, except that the differential variable gain amplifier 16 with the integrated CMR and the FSSD constitute the FSNC 30, the configuration is the same as that of FIG. 6.

In FIG. 7, the FSSD 31 has a band pass filtering function and converts a received single input signal into a differential signal in a wanted signal frequency band and outputs it as a common mode signal in an unwanted signal frequency band through a differential output terminal.

The common mode rejector differential variable gain amplifier 16 performs filtering on a common mode signal of the differential output terminal to reduce overlapping noise during subsampling, variable-amplifies the differential signal with a part of a function of a band filter, and converts it into a differential input signal having an input signal amplitude range of the next stage. Accordingly, the input of the ADC has an input signal amplitude range where a wanted signal and some unwanted signal adjacent thereto are processed. The ADC 50 samples an input signal with a sampling clock of a predetermined frequency so that subsampling is accomplished on a carrier frequency of the input signal and oversampling is accomplished on a bandwidth of a wanted signal. Therefore, an analog signal applied through the common mode rejector differential variable gain amplifier 16 is converted into a digital signal of a DC frequency band or a digital signal of an intermediate frequency band. The ADC 50 includes a high-speed input unit for sampling a signal having a higher frequency than the sampling clock and has a dynamic range where a wanted signal and some unwanted signal adjacent thereto are processed.

A dynamic range of the ADC 50 varies as a full scale voltage of the ADC varies. If a full scale voltage is lowered with a small input signal, a SNR of the signal itself is improved. Accordingly, sensitivity power level is lowered. In addition, if an input signal is large, a full scale voltage is raised to improve linearity of inputted signals. Like this, adjusting of a full scale voltage may uniformly maintain a bit width even if an amplitude of an input signal is changed. For example, if the ADC needs to have a relatively broad signal input amplitude range, an output bit width of the ADC may broaden by that much. As a result, complexity of hardware may be less by adjusting of a full scale voltage. Like this, when the ADC has a relatively broad input signal range, hardware of a DSP becomes simple. Therefore, performance is greatly improved in the subsampling based receiver.

In case of the receiver of FIG. 7, it has the less number of filters due to an initial stage arrangement of the FSNC compared to the receiver of FIG. 5. Accordingly, the number of filters is minimized or reduced, a complete integration of the subsampling based receiver becomes possible.

Figure 8:
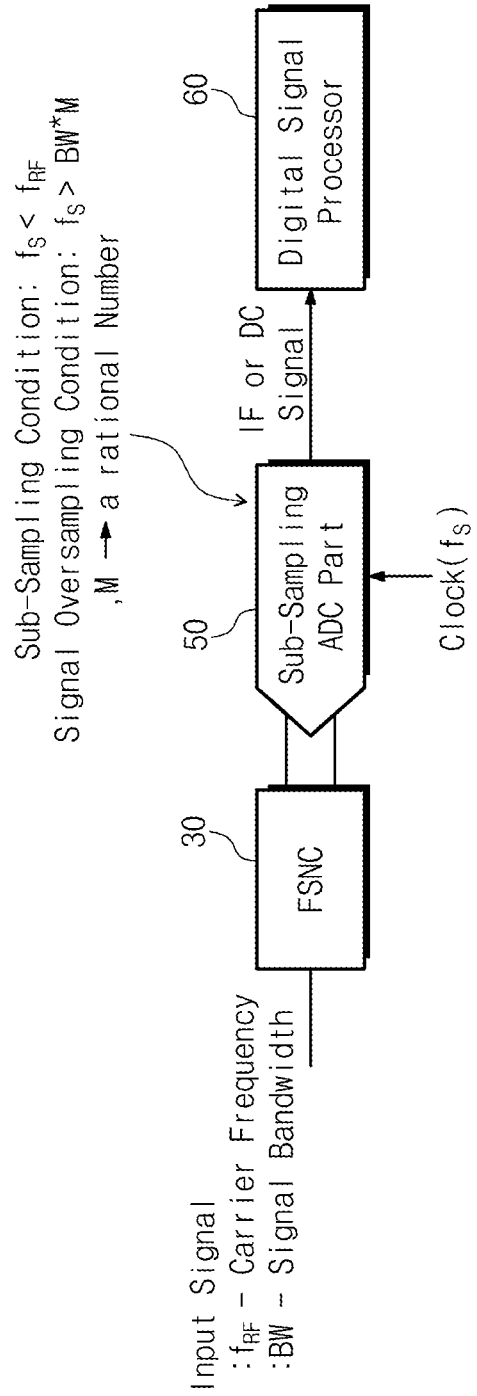
FIG. 8 is a device block diagram of a subsampling based receiver adopting the FSNC of FIG. 3 according to an embodiment of the present invention.

FIG. 8 is a device block diagram of a subsampling based receiver adopting the FSNC of FIG. 3 according to an embodiment of the present invention.

Referring to FIG. 8, the receiver includes an FSNC 30, an ADC 50, and a DSP 60.

The FSNC 30 has a band pass filtering function, converts a received single input signal into a differential signal in a wanted signal frequency band to output it through a differential output terminal, and outputs it as a common mode signal in an unwanted signal frequency band, so that overlapping noise is reduced during subsampling by performing filtering on a common mode signal of the differential output terminal.

The ADC 50 samples an input signal with a sampling clock of a predetermined frequency, so that subsampling is accomplished on a carrier frequency of an input signal and oversampling is accomplished on a bandwidth of a wanted signal. Therefore, an analog signal applied through the FSNC 30 is converted into a digital signal of a DC frequency band or a digital signal of an intermediate frequency band.

The DSP 60 processes the digital signal outputted from the ADC 50 according to a set reception processing function.

In case of FIG. 8, before subsampling, noise is sufficiently removed using the FSNC 30 so that a subsampling task in the ADC is performed in low noise environment. The ADC of FIG. 8 may internally include a sampler.

In typical cases, an ADC is mainly applied based on Nyquist sampling theory. Theoretically, signal conversion is possible by subsampling but in a system requiring a high performance (i.e., a high SNR), signal conversion may become significantly difficult due to aliasing caused by subsampling. However, in case of FIG. 8, by arranging the FSNC 30 at the initial stage, signal conversion using a typical subsampling method becomes excellent. That is, according to the configuration of FIG. 8, according to the FSNC 30 equipped, an arbitrary analog signal may be converted into a digital signal having a high SNR by using a sampler.

FIG. 9 is a view illustrating a subsampling method used exemplarily in the present invention.

In an embodiment of the present invention, a sampling frequency during subsampling is set to be lower than a carrier frequency signal of an input signal and higher than two times of a rational number of a signal bandwidth. As a result, a sampling frequency is determined to allow a noise reduction and signal power mapping unit to sufficiently reduce aliasing noise and interfere signals occurring during subsampling. Accordingly, an output of the ADC may have a predetermined SNR. If aliasing noise or interfere signals occur more than a predetermined ratio during subsampling so that it is determined that the noise reduction and signal power mapping unit does not perform a reduction function, the sampling frequency may be set higher than before.

In FIG. 9, a vertical axis of a signal frequency waveform at the top and bottom represents a frequency and its horizontal axis represents a size (amplitude) of a signal. In the signal frequency waveform at the top, as shown with the reference number 520, there are signals in an oversampling interval T20 of a band. However, there is no signal at an interval T2 in the signal frequency waveform at the bottom due to adjustment of a sampling frequency and noise reduction.

As a result, FIG. 9 illustrates that a center frequency of a wanted signal is at a point where is N times of a subsampling frequency and a wanted signal is spaced by an IF frequency from at a point where is N times of a subsampling frequency. In the drawings, a signal on fos corresponds to noise overlapping in a wanted signal band during subsampling. A sampling frequency needs to be determined to sufficiently reduce the noise in a filter.

In FIG. 9, signals from a center frequency of a wanted signal to fos/2 converted into a digital signal by an ADC and then is removed by a digital filter. Additionally, signals from fos/2 to fos are primarily reduced at the front end of the ADC and then, secondarily is digitally removed by a digital filter.

Figure 10:
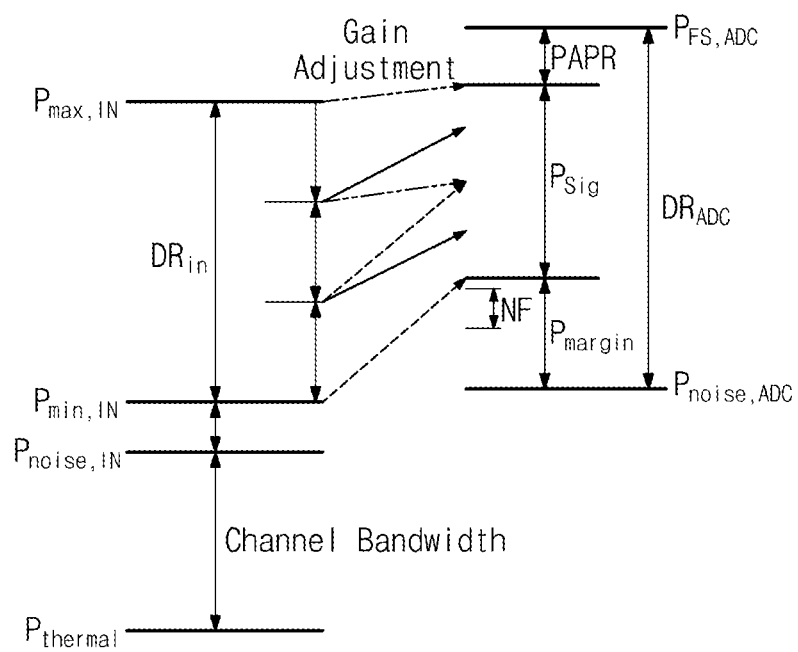
FIG. 10 is a view illustrating a receiver specification design exemplarily according to an embodiment of the present invention.

FIG. 10 is a view illustrating a receiver specification design exemplarily according to an embodiment of the present invention. Referring to FIG. 10, as an input signal range of an ADC is greater, design of the ADC becomes difficult. Therefore, a signal output range of a variable gain amplifier installed at the front end of the ADC needs to be fit for an input signal amplitude range of a designed ADC. Of course, determining the maximum input signal range of the ADC needs to be considered according to a wanted signal amplitude, the maximum amplitude of an inputted interfere signal, and various design margins.

Figure 11:
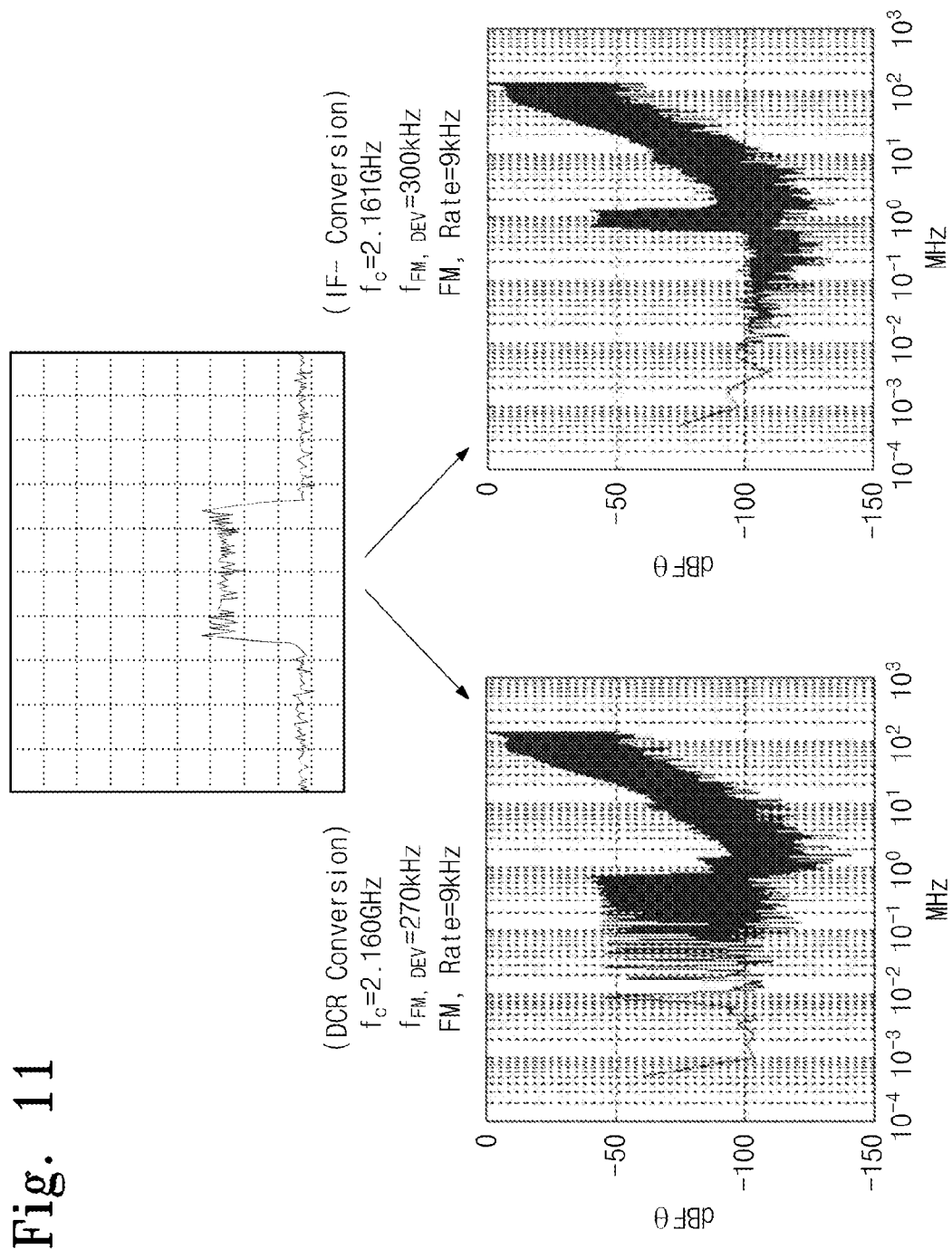
FIG. 11 is a view illustrating a performance measuring result of a receiver manufactured with an integrated Delta-Sigma ADC according to an embodiment of the present invention.

FIG. 11 is a view illustrating a performance measuring result of a receiver manufactured with an integrated Delta-Sigma ADC according to an embodiment of the present invention.

In FIG. 11, after a FM-modulated signal is applied to the receiver manufactured according to an embodiment of the present invention, a result measuring an output of an ADC in a chip is shown. A horizontal axis represents a frequency domain and a vertical axis represents an amplitude (a voltage) domain of an output signal. The measurement result shown at the top of the drawing represents that a signal modulated in an IF frequency region is frequency-converted.

Figure 12:
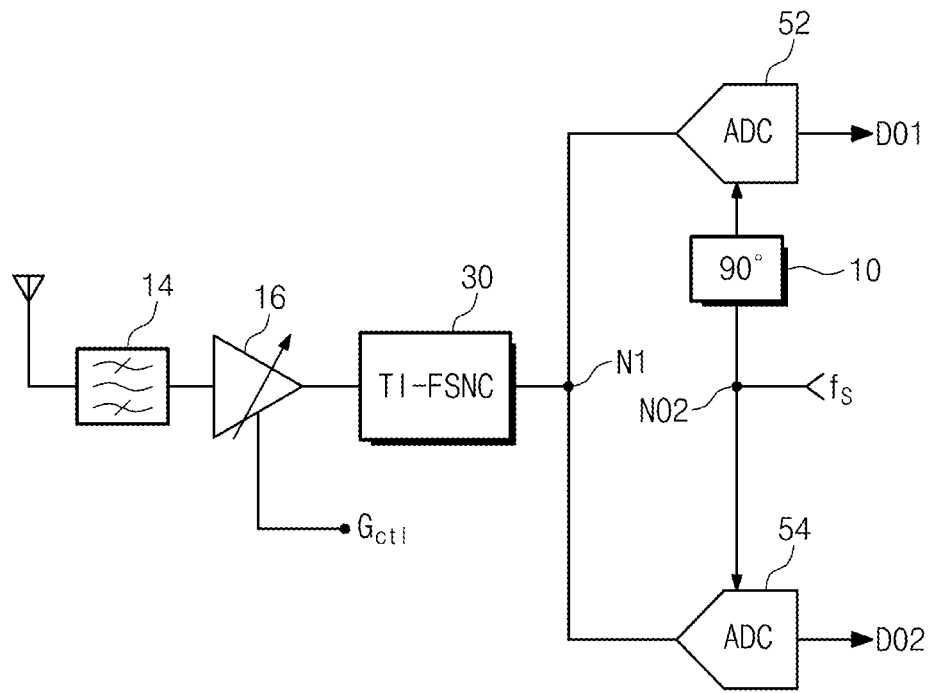
FIGS. 12 and 13 are views illustrating noise reduction and a sampling method of an ADC in a subsampling based structure according to an embodiment of the present invention.
Figure 13:
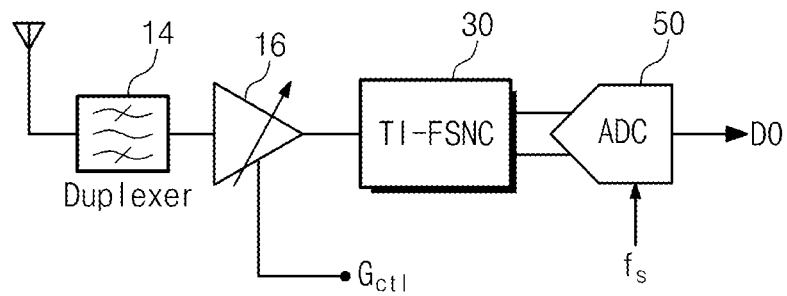

FIGS. 12 and 13 are views illustrating noise reduction and a sampling method of an ADC in a subsampling based structure according to an embodiment of the present invention.

First, referring to FIG. 12, the receiver of a subsampling structure using an I/Q ADC includes a filter 14, a variable amplifier 16, an FSNC 30, and first and second ADCs 52 and 54. Moreover, referring to FIG. 13, the receives of a subsampling structure using a single ADC includes a filter 14, a variable amplifier 16, an FSNC 30, and an ADC 50.

First, in FIG. 12, the first and second ADCs as an I/Q ADC receive I/Q sampling clocks of orthogonal relation separately and then operate. The I/Q ADC in an RF/analog block has a structure through which an I/Q clock of orthogonal relation is directly supplied. If an ADC of an I/Q path is used, since a signal separated into I/Q in a mixer is inputted into an I/Q ADC in a typical I/Q separating method, a signal, which is already separated into an I/Q signal is sampled using a sampling clock having the same phase. Compared to this, in case of FIG. 12, according to the structure, an I/Q signal separated already at the front end is not sampled using a sampling clock having the same phase but an output signal of a node N1 outputted from the FSNC 30 is instantly sampled using clocks (a first clock and a second clock perpendicular thereto) having respective 90° phase differences. Accordingly, an output of I-ADC 52 and an output of Q-ADC 54 become a digital output having respective 90° phase differences in the I/Q ADC. The phase difference of these digital outputs is compensated by a DSP installed at the rear end. As a result, the I/Q digital output is digitally and accurately latched simply using a clock of the same phase in the DSP. Moreover, if it is assumed that a clock phase is set to an I channel when an I/Q ADC performs sampling in a typical receiver, data of a Q channel has a phase difference with respect to an I channel. Therefore, data eye at the sampling point of the I/Q ADC at the rear end of the I/Q sampler is reduced. However, in case of the receiver of FIG. 12, since the I and Q channel signals are respectively sampled using clocks having the respective 90° phase differences, reduction of the data eye is prevented. Furthermore, since an additional sampler is removed in the receiver of FIG. 12, an occupying area of a chip and power consumption are decreased. Additionally, compared to a typical receiver adopting a passive subsampler, signal power reduction may be prevented.

As shown in FIGS. 12 and 13, the filter 14 installed between the variable gain amplifier 16 and the ADC 50, 52, and 54 is a functional block having an impedance conversion function for converting a voltage size of a signal power delivered to the ADC and a frequency selective noise removing function using a common mode suppression circuit.

Since a receiver structure realized with only an amplifier and an ADC need to perform all amplifications at the front end of an ADC, amplification becomes a big issue. Therefore, by allowing the FSNC 30 to convert a voltage amplitude of signal power delivered from an RF terminal to an ADC, subsampling is performed on a properly amplified signal.

According to exemplary configurations of the present invention, a frequency selective noise canceller is equipped in a digital receiver so that noise removing performance is maximized or improved.

Moreover, over sampling is done on a signal band when a received analog RF signal is converted into an IF signal or DC signal through a subsampling method and noise signals adjacent to a wanted signal are digitally removed in a DSP. Thus, a receiver mainly with a digital region design may be manufactured. Accordingly, the receiver may be easily applied to multi-standards and may be digitally designed each time process is upgraded. Moreover, time-to-market is reduced and thus market applicability is improved. Additionally, a design margin of an ADC may be sufficiently secure.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A frequency selective noise canceller for effectively reducing overlapping noise during subsampling, comprising:
a frequency selective single to differential converter having a band pass filter function and configured to convert a received single input signal into a differential signal in a wanted signal pass frequency band and into a common mode signal in an unwanted signal frequency band; and
a common mode rejector configured to receive the differential signal and the common mode signal, pass the differential signal, and filter the common mode signal.

2. The frequency selective noise canceller of claim 1, further comprising an impedance converter configured to convert a signal voltage amplitude of a signal power delivered to a rear end of the common mode rejector.

3. The frequency selective noise canceller of claim 1 or 2, wherein the common mode rejector comprises a passive device or a differential amplifier.

4. A receiver comprising:
a frequency selective noise canceller having a band pass filtering function and configured to convert a received single input signal into a differential signal in a wanted signal pass frequency band, convert the received single input signal into a common mode signal in an unwanted signal frequency band, and filter the common mode signal, thereby effectively reducing overlapping noise during subsampling;
an analog-to-digital converter configured to sample an output signal of the frequency selective noise canceller with a sampling clock of a predetermined frequency, subsample a carrier frequency of the output signal, and oversample a bandwidth of a wanted signal, thereby converting an analog signal applied through the frequency selective noise canceller into a digital signal of a DC frequency band or a digital signal of an intermediate frequency band; and
a digital signal processor configured to process the digital signal outputted from the analog-to-digital converter according to a predetermined reception processing function.

5. A receiver comprising:
a single input/output filter and variable gain amplifier configured to perform band pass filtering and variable gain amplification on an input signal;
a frequency selective noise canceller having a band pass filtering function and configured to convert a single input signal provided from the variable gain amplifier into a differential signal in a wanted signal pass frequency band, convert the single input signal as into a common mode signal in an unwanted signal frequency band, and filter the common mode signal, thereby effectively reducing overlapping noise during subsampling;
an analog-to-digital converter including a high-speed input unit and having a signal input amplitude range where a wanted signal and unwanted signals adjacent to the wanted signal are processed, the high-speed input unit configured to sample an output signal provided from the frequency selective noise canceller with a sampling clock of a predetermined frequency, subsample a carrier frequency of the output signal, and oversample a bandwidth of the wanted signal, thereby converting an analog signal applied through the frequency selective noise canceller into a digital signal of a DC frequency band or a digital signal of an intermediate frequency band, and sampling a signal of a higher frequency than that of the sampling clock; and
a digital signal processor configured to perform at least one of signal frequency conversion, channel filtering, a variable gain amplification function, and a modulation/demodulation function by processing the digital signal outputted from the analog-to-digital converter.

6. A receiver comprising:
a frequency selective noise canceller having a band pass filtering function and configured to convert a single input signal into a differential signal in a wanted signal pass frequency band, convert the single input signal into a common mode signal in an unwanted signal frequency band, and perform filtering on the common mode signal, thereby effectively reducing overlapping noise during subsampling;
a differential variable gain amplifier configured to perform band pass filtering and variable gain amplification on an output signal of the frequency selective noise canceller to change a signal input amplitude range of the output signal to be adaptable to a next end;
an analog-to-digital converter including a high-speed input unit and having a signal input amplitude range where a wanted signal and unwanted signals adjacent to the wanted signal are processed, the high-speed input unit configured to sample an amplified signal provided from the differential variable gain amplifier with a sampling clock of a predetermined frequency, subsample a carrier frequency of the amplified signal, and oversample a bandwidth of the wanted signal, thereby converting an analog signal applied through the differential variable amplifier into a digital signal of a DC frequency band or a digital signal of an intermediate frequency band and sampling a signal of a higher frequency than that of the sampling clock; and a digital signal processor configured to perform at least one of signal frequency conversion, channel filtering, a variable gain amplification function, and a modulation/demodulation function by processing the digital signal outputted from the analog-to-digital converter.

7. A receiver comprising:

a frequency selective noise canceller having a band pass filtering function and configured to convert a received single input signal into a differential signal in a wanted signal pass frequency band, and convert the received single input signal into a common mode signal in an unwanted signal frequency band;

an analog-to-digital converter having a signal input amplitude range where a wanted signal and unwanted signals adjacent to the wanted signal are processed and including a common mode rejector differential amplifier and a high speed input unit, wherein the common mode rejector differential amplifier is configured to perform filtering on the common mode signal to reduce overlapping noise during subsampling and perform variable-gain-amplifying on the differential signal to change a signal input amplitude range of the differential signal to be adaptable to a next end, and wherein the high-speed input unit is configured to sample an output signal of the common mode rejector with a sampling clock of a predetermined frequency, perform subsampling on a carrier frequency of the output signal, and perform oversampling on a bandwidth of a wanted signal, thereby converting an analog signal applied through the common mode rejector differential amplifier into a digital signal of a DC frequency band or a digital signal of an intermediate frequency band and sampling a signal of a higher frequency than that of the sampling clock; and a digital signal processor configured to perform at least one of a signal frequency conversion, channel filtering, a variable gain amplification function, and a modulation/ demodulation function by processing the digital signal outputted from the analog-to-digital converter.

8. The receiver of any one of claims 5 to 7, wherein the variable gain amplifier further comprises an interferer signal reduction or band pass filtering function.

9. The receiver of claim 4, wherein the analog-to-digital converter comprises a high-speed input unit configured to sample a signal having a higher frequency than that of the sampling clock.

10. The receiver of any one of claims 4 to 6, wherein the frequency selective noise canceller further comprises an impedance converter configured to convert a signal voltage amplitude of a signal power delivered to the analog-to-digital converter.

11. The receiver of any one of claims 4 to 7, wherein the common mode signal is removed by a circuit of a differential amplifier form equipped in the analog-to-digital converter.

12. The receiver of any one of claims 4 to 7, wherein the analog-to-digital converter comprises one or a plurality of parallel analog-to-digital converters, wherein each of the plurality of parallel analog-to-digital converters is configured to classify a signal channel of a wideband into a plurality of sub signal channels and process a signal so that the digital signal processor performs digital filtering and digital data recombination in a digital part and the analog-to-digital converter receives at least one sampling clock signal.

13. The receiver of any one of claims 4 to 7, wherein the analog-to-digital converter comprises an I-path subsampling analog-to-digital converter and a Q-path subsampling analog-to-digital converter, the I-path and Q-path subsampling analog-to-digital converters configured to convert an input analog signal into an I signal and a Q signal orthogonal to the I signal, respectively, in response to a first clock signal and a second clock signal orthogonal to the first clock signal, so that the I signal and the Q signal are synchronized by a clock signal having the same phase in a digital block.

14. The receiver of any one of claims 4 to 7, wherein, if the analog-to-digital converter comprises an I-path subsampling analog-to-digital converter and a Q-path subsampling analog-to-digital converter, each of the I-path and Q-path subsampling analog-to-digital converters comprises one or a plurality of parallel analog-to-digital converters, and wherein each of the plurality of parallel analog-to-digital converters is configured to classify a signal channel of a wideband into a plurality of sub signal channels and process a signal so that the digital signal processor performs digital filtering and digital data recombination in a digital part and the analog-to-digital converter receives at least one sampling clock signal.

15. The receiver of claim 4, wherein the analog-to-digital converter has a broad signal input amplitude range processing the wanted signal and some unwanted signals adjacent to the wanted signal.

16. The receiver of claim 4, wherein the digital signal processor is configured to perform at least one of signal frequency conversion, channel filtering, a variable gain amplification function, and a modulation/demodulation function.

17. The receiver of any one of claims 4 to 7, wherein an input signal amplitude range of the analog-to-digital converter is adjusted according to variation of a full scale voltage of the analog-to-digital converter.

* * * * *